United States Patent Office 3,079,361
Patented Feb. 26, 1963

3,079,361
TREATED SILICEOUS ARTICLE
Edwin P. Plueddemann, Midland, Mich., assignor to Dow Corning Corporation, Midland, Mich., a corporation of Michigan
No Drawing. Filed Aug. 31, 1959, Ser. No. 836,920
2 Claims. (Cl. 260—40)

This invention relates to a siliceous material coated with a vinylphenylsiloxane.

It is known, for example, in U.S. Patent 2,742,378 that when siliceous materials are coated with vinylsiloxanes, the resulting products give superior bonding to vinylic resins. As a result it is possible to prepare, for example, glass-polyester laminates having higher physical properties particularly under moist conditions than when the siliceous material is not treated with the vinylsiloxane. It is also known that allylsiloxanes give a similar improvement but they are less effective in general than vinylsiloxanes.

It has been theorized that the improvement of bond strength between the siliceous surface and the vinylic resin is brought about because the vinyl or allylsiloxane becomes chemically bonded to both the siliceous surface and the vinylic resin. It is bonded to the siliceous surface through a SiOSi linkage by way of the reaction of a hydrolyzable group on a vinylsilane with a hydroxyl on the siliceous surface. The vinyl group on the siloxane reacts with the unsaturated groups in the vinylic resin when the resin is polymerized in contact with the siloxane treated siliceous material. In the present invention the applicant is not limiting his invention to any such explanation. Applicant only states that when siliceous materials are treated as hereinafter described, improved laminates with vinylic resins are obtained.

It is the object of this invention to provide a coated siliceous article which gives superior strength when molded with vinylic resins. Another object is to provide improved glass fibers for use in glass-polyester laminates. Other objects and advantages will be apparent from the following description.

This invention relates to an article of manufacture comprising a siliceous material the surface of which is coated with mono-(vinylphenyl)ethylsiloxane in amount of at least .01% by weight based on the weight of the siliceous material.

The term "siloxane" as employed in the specification and claims includes siloxanes which have residual silicon-bonded hydroxyl groups and which can contain some residual hydrolyzable groups.

The position of the vinyl group on the phenyl radical is not critical and the (vinylphenyl) group can be either alpha or beta with respect to the silicon. Thus, the term "siloxane" includes the ortho, meta and para-alpha(vinylphenyl)ethylsiloxane and ortho, meta and para-beta (vinylphenyl)ethylsiloxane. Thus one can employ any one of these isomers alone or a mixture of any two or more of them.

The articles of this invention are prepared by contacting the siliceous material with a silane of the formula

or

in which X is a hydrolyzable atom or group or with the hydrolyzate of such silane, i.e. the mono-(vinylphenyl)ethylsiloxane or siloxanol. The silane or its hydrolyzate can be applied to the surface of the siliceous material in any suitable manner such as by brushing, dipping, or spraying or by exposing the siliceous material to the vapors of the hydrolyzable silane. The silane or its hydrolyzate can be applied to the siliceous material per se or they can be applied in the form of a solution in organic solvents or water or in the form of an emulsion.

When the silane contacts the surface of the siliceous material it hydrolyzes and condenses thereon to produce mono-(vinylphenyl)ethylsiloxane. The formation of the siloxane and its cure are facilitated by heating the coated glass so as to remove any solvent and hydrolysis by-product. The curing temperature is not critical and will vary with the form in which the silane is applied. For example, if the silane hydrolysis by-products (i.e. XH products) are volatile, a minimum of heating is required to remove them from the surface of the siliceous material and to set the siloxane. If these by-products are non-volatile, then a higher temperature is needed or the siliceous material can be both heated and washed. In general, heating at temperatures from 100 to 200° C. for a few minutes is sufficient.

Regardless of the method of applying the silane or its hydrolyzate, the amount employed should be sufficient to give a weight pickup on the siliceous material of at least .01% by weight based on the weight of the siliceous material. Preferably the weight pickup should be from .01 to 1% since there is generally no advantage in applying more than 1% by weight of the organosilicon compound. It should be understood, however, that the 1% limitation is not critical.

In general, satisfactory pickup can be obtained by wetting the siliceous material with a solution or emulsion of the organosilicon compound having a concentration of between .01 and 10% by weight of the latter.

For the purpose of this invention the X hydrolyzable groups on the silane can be any hydrolyzable group. As is well known hydrolyzable groups are any groups or atoms which are attached to silicon through a silicon-halogen bond, a silicon-oxygen bond (with the exception of SiOSi), a silicon-nitrogen bond or a silicon-sulfur bond. Specific examples of hydrolyzable silanes are those in which X is (1) halogen such as chlorine, bromine, or iodine; (2) OR where R is a monovalent hydrocarbon or a monovalent halohydrocarbon radical such as methyl, ethyl, octadecyl, vinyl, allyl, hexenyl, cyclohexyl, cyclopentyl, phenyl, tolyl, xylyl, benzyl, chloroethyl, trifluoropropyl, chlorophenyl, bromocyclohexyl, iodonaphthyl, and chlorovinyl; where R is hydroxyhydrocarbon radicals such as beta-hydroxyethyl, beta-hydroxypropyl, omega-hydroxyoctadecyl, para-hydroxyphenyl, hydroxycyclohexyl or beta-gamma-dihydroxypropyl; where R is an etherated hydrocarbon or halohydrocarbon radical having the formula —OR(OR)$_x$OY where R is hydrocarbon or halohydrocarbon and Y is hydrocarbon or H, such as those derived from polyethylene glycols or polypropylene glycols and their monohydrocarbon ethers in which $x$ is an integer such as 1, 2, 5, 8 or 10, or those derived from halogenated glycols such as chloropropylene glycol; (3) amino radicals in which the nitrogen is bonded to the silicon such as dimethylamino, methylamino and (4) sulfonated radicals containing the SiS bond such as SH, SR where R is a monovalent organic radical such as methyl, ethyl, chlorobutyl, etc.

It should be understood that the silane can be a monomeric material, that is a silane in which X is a monovalent radical or a polymeric material, that is a silane in which one or more X's is a polyvalent radical. Thus, for example, the silane can be in the form of silazanes in which the silicons are bonded through nitrogen atoms and each silicon has one beta-(vinylphenyl)ethyl group attached thereto. The silanes can also be polysilthienes in which the silicons are bonded through sulfur atoms and each silicon has a beta-(vinylphenyl)ethyl radical attached thereto.

The silanes of this invention are best prepared by reacting a trihalosilane such as trichlorosilane with divinylbenzene in the proportion of at least one mole divinylbenzene per mol of silane at a temperature of 50 to 70° C. in the presence of an addition catalyst such as platinum on charcoal or chloroplatinic acid. In carrying out the addition it is well to add a polymerization inhibitor such as catechol to minimize or prevent polymerization of the divinylbenzene.

This reaction is generally applicable to the addition of divinylbenzene to any silane of the formula $HSiX_3$ where X is any of the groups specified above. Alternatively one may first prepare a halosilane and then convert this to other desirable silanes by reaction of the halosilane with a suitable reagent. For example, with alcohols to produce alkoxysilanes; with amines to produce silazanes; with $H_2S$ to produce silthienes, etc.

The siliceous materials employed in this invention can be in any suitable form such as powders, flakes or fibers and they can be of any siliceous material such as glass, asbestos, mica, silica (either natural or artificial) or clay.

The coated articles of this invention show improved strength when molded with any vinylic resin, that is any resin formed from a monomer containing a carbon-carbon unsaturated linkage. Specific examples of such resins are styrene, unsaturated polyesters; acrylic resins such as methylmethacrylate, ethylmethacrylate or ethylacrylate; butadiene-styrene copolymers, polyisoprene, polychloroprene, polyisobutylene, polyvinylchloride, polyvinylidene chloride, polyacrylonitrile and alkenylsiloxanes such as vinylsiloxane or copolymers of vinylsiloxane with methyl and phenylsiloxanes.

In forming the composite articles of this invention it is only necessary to mix the treated siliceous material with the vinylic monomer or partially polymerized vinylic resin in the desired proportion and thereafter cure the vinylic composition by conventional means. The conventional means for curing such resins is by polymerization with peroxides or sulfur or sulfur accelerators.

It should be understood that the siliceous material can be coated with copolymers of mono-(vinylphenyl)ethylsiloxane and other siloxanes such as methyl, phenyl or aminoalkylsiloxanes. In such cases the percent pickup has reference to the weight of the mono-(vinylphenyl)ethylsiloxane portion of the copolymer. Such copolymers are within the scope of the claims.

The following examples are illustrative only and should not be construed as limiting the invention which is properly delineated in the appended claims.

EXAMPLE 1

A mixture of meta and para divinylbenzene was reacted with trichlorosilane in the mol ratio of 1.5 mol of divinylbenzene per mol of trichlorosilane as follows:

The divinylbenzene was mixed with t-butylcatechol and warmed at 100° C. The trichlorosilane was then added slowly whereupon addition took place to produce a mixture of the meta and para isomers of the alpha and beta-(vinylphenyl)ethyltrichlorosilanes. This material has the following properties: B.P. 97 to 100° C. at .6 mm., $d_4^{25}$ of 1.212 and $n_D^{25}$ 1.5300.

EXAMPLE 2

.4 mol of a mixture of meta and para isomers of alpha and beta-(vinylphenyl)ethyltrichlorosilane was mixed with 1.32 mols of acetic anhydride and the mixture was warmed one hour at 60° C. The by-produced acetyl chloride and excess acetic anhydride were removed by distillation. The residue was a mixture of the meta and para isomers of alpha and beta-(vinylphenyl)ethyltriacetoxysilane having a sp. gr. of 1.119, $n_D^{25}$ of 1.4848 and a viscosity at 25° C. of 58.8 cs.

EXAMPLE 3

.2 mol of a mixture of alpha and beta-(vinylphenyl)-ethyltrichlorosilane was mixed with 50 cc. of methylene chloride. The solution was warmed to reflux and 50.2 g. of the monomethyl ether of ethylene glycol was added dropwise with stirring. After addition was complete the mixture was refluxed for one hour under slightly reduced pressure. The methylene chloride and excess glycol ether were removed by distillation to give a residue which was a mixture of

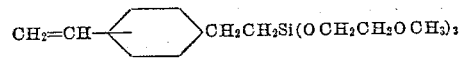

and

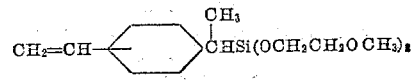

EXAMPLE 4

The improvement produced by the materials of this invention for reinforcing glass-polyester laminates over the previously employed vinylsiloxane is shown in the following example:

In each case heat-cleaned 181 glass cloth was employed. The cloth was immersed in a solution of the silane having a concentration shown in the table below. The treated cloth was then air-dried and heated 7 minutes at 350° F. In the case of the trichlorosilane the cloth was then washed until free of acid.

Each treated cloth was then impregnated with a commercial polyester resin which consisted of a mixture of styrene and a copolymer of maleic anhydride, phthalic anhydride and ethylene glycol. The polyester mixture had a viscosity of 3000 cs. The resin was mixed with one-half percent by weight benzoyl peroxide prior to impregnation of the cloth.

Each sample of impregnated cloth was then stacked into a 14-ply laminate and thereafter cured one-half hour at 100° C. at 30 p.s.i. In each case the resulting laminate was about ⅛ inch thick. The flexural and compressive strength for each laminate was determined under dry and wet conditions. The dry strength was determined by measuring the flexural and compressive strength of the laminate after molding. The wet strengths were determined in accordance with Federal Specification L-P-406B. Briefly this test comprises immersing the laminate in boiling water for two hours, removing and quenching with cold water and then immediately determining the flexural and compressive strength. The results of these tests are shown in the table below.

*Table*

| Silane | Solvent | Conc. of solution in percent by wt. silane | Flexural strength in p.s.i. | | Compressive strength in p.s.i. | |
|---|---|---|---|---|---|---|
| | | | Dry | Wet | Dry | Wet |
| Example 1 | Toluene | 0.2 | 92,100 | 84,100 | 46,400 | 43,300 |
| | | 0.5 | 92,600 | 88,000 | 44,400 | 40,200 |
| Example 2 | do | 0.2 | 90,200 | 86,700 | 49,500 | 50,800 |
| | | 0.1 | 84,100 | 83,400 | 37,200 | 39,500 |
| | | 0.5 | 82,600 | 78,200 | 46,400 | 43,600 |
| Comm. finish | Water | 0.3 | 67,900 | 54,100 | 35,600 | 22,100 |
| Mixture of vinyl and allyl silanes | | 0.5 | 60,100 | 47,600 | 30,700 | 21,700 |
| Comm. vinyl siloxane glass finish | Water | about 0.5 | 50,000 | | 46,000 | 39,000 |

EXAMPLE 5

Equivalent results are obtained when the following compositions are applied to glass cloth in accordance with the procedure of Example 4 and the product is laminated with a polyester resin in accordance with that example. In the table below Y is the

group.

| Composition | Form applied |
|---|---|
| YSi[N(CH$_3$)$_2$]$_3$ | Toluene solution. |
| YSi(OC$_6$H$_4$OH)$_3$ | Do. |
| YSi(N—H—)$_{3/2}$ | Heptane solution. |
| YSi[OCH$_2$CH$_2$N(CH$_3$)$_2$·HCl]$_3$ | Water solution. |
| YSi(SC$_2$H$_5$)$_3$ | Toluene. |
| YSi(OCH$_2$CH$_2$OCH$_3$)$_3$ | Do. |
| YSi(S)$_{3/2}$ | Do. |
| YSiO$_{2.5}$(OH).$_3$* | Aqueous emulsion. |

*Made by hydrolyzing YSiCl$_3$ in a mixture of alcohol and toluene, washing free of acid, mixing the resulting solution with 10% by weight based on the siloxane resin of an alkylated phenol ether of a polyalkylene glycol and stirring the mixture with water.

EXAMPLE 6

Improved results are obtained when sand, clay, asbestos, mica and diatomaceous earth are substituted for glass in the procedure of Example 4. This improvement is with respect to these materials which are untreated or which are coated with vinylsiloxane.

That which is claimed is:

1. An article of manufacture comprising a siliceous material the surface of which is coated with mono-(vinylphenyl)ethylsiloxane in amount of at least .01 percent by weight based on the weight of the siliceous material.

2. A composite article of improved flexural strength comprising (1) a siliceous material selected from the group consisting of particulated and fibrous siliceous materials, which has been coated with mono-(vinylphenyl) ethylsiloxane in amount of at least .01 percent by weight based on the weight of the siliceous material and (2) a cured vinylic resin which impregnates and bonds the siliceous material into a unitary mass.

References Cited in the file of this patent
UNITED STATES PATENTS

| | | |
|---|---|---|
| 2,570,551 | Hatcher et al. | Oct. 9, 1951 |
| 2,742,378 | Te Grotenhuis | Apr. 17, 1956 |
| 2,841,566 | Te Grotenhuis | July 1, 1958 |